(12) United States Patent
Kobayashi et al.

(10) Patent No.: US 8,292,115 B2
(45) Date of Patent: Oct. 23, 2012

(54) FUEL TANK WITH FUEL PUMP MOUNTING STRUCTURE

(75) Inventors: Akihito Kobayashi, Saitama (JP); Yuki Mizukura, Saitama (JP); Takahiro Matayoshi, Saitama (JP); Tomoyuki Matsumura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 654 days.

(21) Appl. No.: 12/354,167

(22) Filed: Jan. 15, 2009

(65) Prior Publication Data

US 2009/0184118 A1 Jul. 23, 2009

(30) Foreign Application Priority Data

Jan. 17, 2008 (JP) .................................. 2008-008392

(51) Int. Cl.
*B60K 15/073* (2006.01)
(52) U.S. Cl. ........ 220/562; 220/319; 220/327; 220/784; 280/833; 280/835
(58) Field of Classification Search ............... 220/62.22, 220/562, 315, 319, 327, 328, 784, 789, 790; 280/833, 835; 137/565.01
See application file for complete search history.

(56) References Cited

U.S. PATENT DOCUMENTS

| | | | | |
|---|---|---|---|---|
| 3,559,844 A * | 2/1971 | Schlosberg | .................... | 220/565 |
| 4,449,723 A * | 5/1984 | Shiratsuchi | .................... | 280/833 |
| 4,759,459 A * | 7/1988 | Bailey et al. | .................. | 220/86.2 |
| 4,775,074 A * | 10/1988 | Ershig | ............................. | 220/323 |
| 5,141,125 A * | 8/1992 | Canty et al. | .................... | 220/820 |
| 5,636,953 A * | 6/1997 | Jaeger et al. | .................. | 411/82.5 |
| 5,870,799 A * | 2/1999 | Benda | ............................. | 16/2.1 |
| 5,979,511 A * | 11/1999 | Ono | ................................. | 141/59 |
| 6,076,858 A * | 6/2000 | Funabashi | ...................... | 280/834 |
| 6,213,514 B1 * | 4/2001 | Natsume et al. | .............. | 280/833 |
| 6,332,555 B1 * | 12/2001 | Stangier | ........................ | 220/562 |
| 6,510,959 B1 * | 1/2003 | Van Newenhizen | ......... | 220/4.12 |
| 6,641,169 B2 * | 11/2003 | Fukunaga et al. | ............ | 280/835 |
| 6,691,962 B1 * | 2/2004 | Krejci | ............................ | 248/214 |
| 6,698,613 B2 * | 3/2004 | Goto et al. | ..................... | 220/562 |
| 6,834,771 B2 * | 12/2004 | Suzuki et al. | .................. | 220/361 |
| 7,063,226 B2 * | 6/2006 | Palvoelgyi et al. | ........... | 220/293 |
| 7,252,170 B2 * | 8/2007 | Miyakozawa et al. | ........ | 180/219 |
| 7,410,191 B2 * | 8/2008 | Karube et al. | ................. | 280/833 |
| 7,416,220 B2 * | 8/2008 | Nakazawa et al. | ............ | 280/835 |
| 7,533,904 B2 * | 5/2009 | Koike et al. | ................... | 280/834 |
| 7,624,829 B2 * | 12/2009 | Kubota | ........................ | 180/69.4 |
| 7,681,682 B2 * | 3/2010 | Miyashiro | ..................... | 180/219 |

(Continued)

FOREIGN PATENT DOCUMENTS

JP       2006-69501 A       3/2006

*Primary Examiner* — Gregory Pickett
*Assistant Examiner* — Ned A Walker
(74) *Attorney, Agent, or Firm* — Birch, Stewart, Kolasch & Birch, LLP

(57) ABSTRACT

An insert ring is mounted on a resin-made fuel tank body, the insert ring has seat surfaces for mounting a fuel pump thereon and boss holes formed in the seat surfaces. An insert molded body is formed by insert molding of the insert ring using a first resin material while leaving the boss holes and the seat surfaces exposed. The insert molded body is inserted into an outer surface of the fuel tank body by insert molding using a second resin material which forms the fuel tank body.

9 Claims, 8 Drawing Sheets

U.S. PATENT DOCUMENTS

| | | |
|---|---|---|
| 7,690,689 B2 * | 4/2010 | Muroo et al. ................. 280/833 |
| 7,731,238 B2 * | 6/2010 | Otsubo et al. ................. 280/835 |
| 2005/0110265 A1 * | 5/2005 | Miyakozawa et al. ........ 280/835 |
| 2006/0068139 A1 * | 3/2006 | Fujitaka et al. .............. 428/35.7 |
| 2007/0023218 A1 * | 2/2007 | Koike et al. ................... 180/219 |
| 2007/0169975 A1 * | 7/2007 | Kubota ........................ 180/69.4 |
| 2007/0254172 A1 * | 11/2007 | Kanazawa et al. ............. 428/461 |
| 2008/0011534 A1 * | 1/2008 | Miyashiro ..................... 180/219 |
| 2008/0203623 A1 * | 8/2008 | Fujitaka et al. ................ 264/515 |
| 2009/0101642 A1 * | 4/2009 | Muto et al. .................... 220/86.2 |
| 2009/0242300 A1 * | 10/2009 | Mizukura et al. ............. 180/69.4 |
| 2009/0242551 A1 * | 10/2009 | Matayoshi et al. .......... 220/4.13 |

* cited by examiner

FUEL TANK WITH FUEL PUMP MOUNTING STRUCTURE

CROSS-REFERENCE TO RELATED APPLICATIONS

The present application claims priority under 35 USC 119 to Japanese Patent Application No. 2008-008392 filed on Jan. 17, 2008 the entire contents of which are hereby incorporated by reference.

BACKGROUND OF THE INVENTION

1. Field of the Invention

The present invention relates to a resin-made fuel tank and the fuel pump mounting structure.

2. Description of Background Art

Conventionally, with respect to a vehicle such as a motorcycle, a fuel tank is known which is made of a resin in place of a metal material such as iron or aluminum for realizing the reduction in weight.

On the other hand, in mounting a part on a resin-made fuel tank, there has been known a technique in which a fastening member such as an insert nut is inserted (embedded) in the fuel tank, and the part is fastened to the fastening member using bolts. See, for example, JP-A-2006-69501. According to JP-A-2006-69501, a portion of the fuel tank into which the insert nut is inserted is preliminarily recessed, and a resin flows into a recess in which the insert nut is set thus inserting the insert nut in the fuel tank.

However, the fastening member which is inserted into the resin-made fuel tank often has a complicated shape. Thus, the insertion of the fastening member into the fuel tank to ensure that the resin wraps around respective portions of the fastening member tends to make the management of manufacture conditions difficult.

SUMMARY AND OBJECTS OF THE INVENTION

The present invention has been made under such circumstances, and it is an object of an embodiment of the present invention to ensure the insertion of a fastening member into a fuel tank by sufficiently making a resin wrap around respective corners of the fastening member using a simple method.

To overcome the above-mentioned drawbacks, an embodiment of the present invention provides a fuel tank which is characterized in that a fastening member is mounted on a resin-made fuel tank body, the fastening member has a seat surface for mounting a part thereon and boss holes which are formed in the seat surface, and an insert molded body is formed by performing insert molding of the fastening member using a first resin material in a state wherein the boss holes and the seat surface are exposed, and the insert molded body is inserted into an outer surface of the fuel tank body by insert molding using a second resin material which forms the fuel tank body.

Due to such constitution, the insert molded body is formed by preliminarily performing the insert molding of the fastening member using the first resin material and, thereafter, the insert molded body is inserted into the outer surface of the fuel tank body by insert molding using the second resin material which forms the fuel tank body. Accordingly, in inserting the fastening member in the fuel tank body, the second resin material is bonded to the insert molded body which is already formed by insert molding using the first resin material. Accordingly, compared to case in which the insert molding is performed by directly inserting the fastening member into the fuel tank body, it is possible to make the resin material easily and sufficiently wrap around the fastening member. Accordingly, it is possible to bond the insert molded body and the second resin material to each other with no gap therebetween without being influenced by the shape of the fastening member. Thus, the fastening member can be surely inserted into an outer surface of the fuel tank body by insert molding thus easily molding the fuel tank.

For example, even when the fastening member has a complicated shape with projections for the prevention of the removal of the fastening member or the like, by preliminarily inserting the fastening member in the first resin material, it is possible to make the wrapping-around of the second resin material smooth thus favorably forming the fuel tank.

Further, the fastening member may be an insert ring which forms a plurality of seat surfaces on an annular-shaped body thereof and the boss holes in the annular-shaped body, and the insert molded body having the plurality of seat surfaces and the plurality of boss holes may be formed by performing insert molding of the fastening member using the first resin material in a state wherein the boss holes and the seat surfaces are exposed.

Due to such a construction, in inserting the annular insert ring having the plurality of seat surfaces and the plurality of boss holes into the fuel tank body, it is possible to allow the resin to sufficiently wrap around the inert ring without influencing the positional relationship between the plurality of seat surfaces and the boss holes. Thus, the fuel tank can be favorably molded.

Further, the insert molded body may be formed by injection molding.

Due to such a construction, the first resin material adheres to the surface of the fastening member and sufficiently wraps around the respective portions of the fastening member by injection molding. Accordingly, by inserting the fastening member in a state wherein the first resin material sufficiently wraps around the fastening member, the insert molded body can be easily molded, and the fuel tank can be favorably molded by performing insert molding of the insert molded body using the second resin material.

Further, the first resin material and the second resin material may be formed of a polyethylene resin, and a molecular weight of the first resin material and a molecular weight of the second resin material may differ from each other.

Due to such a construction, with the use of polyethylenes having molecular weights which exhibit resin fluidities respectively suitable for the molding method at the time of molding the insert molded body using the first resin material and the molding method at the time of further performing insert molding of the insert molded body using the second resin material, the resin favorably wraps around. Thus, the fuel tank can be favorably molded.

Further, an annular groove or a stepped portion which allows fitting of an O-ring therein may be formed on a surface of the first resin material of the insert molded body in an approximately concentric manner with the annular-shaped body at the time of forming the insert molded body by injection molding.

Due to such a construction, the groove or the stepped portion for mounting the O-ring can be easily formed by injection molding. Further, for example, when such a groove or a stepped portion is formed in molding the fuel tank body using the second resin material, there may be a case wherein it is difficult to make the second resin material surely wrap around the insert molded body. However, by preliminarily forming such a groove or a stepped portion on the insert molded body, it is unnecessary to form the groove or the stepped portion at the time of molding the fuel tank body. Thus, it is possible to make the resin surely wrap around the insert molded body whereby the fuel tank can be favorably molded.

Further, the annular groove formed in the insert molded body may be formed so as to overlap with the insert ring as viewed from a seat-surface side.

Due to such a construction, the annular-shaped body of the fastening member is positioned in the direction that the O-ring arranged in the groove receives a force. Thus, the force which the O-ring receives is received by the annular-shaped body whereby a strength of a mounting surface of the O-ring can be ensured.

Further, an embodiment of the present invention provides the fuel pump mounting structure for mounting a fuel pump on a bottom portion of a fuel tank body in a motorcycle having the construction in which an engine and a fuel tank which is arranged above the engine and is formed by molding using a resin are supported on a vehicle body frame, wherein the fuel tank is configured such that an insert ring having a seat surface for mounting the fuel pump thereon and boss holes which are formed in the seat surface is mounted on a resin-made fuel tank body, an insert molded body is formed by performing insert molding of the insert ring using a first resin material in a state wherein the boss holes and the seat surface are exposed, and the insert molded body is inserted into an outer surface of the fuel tank body by insert molding using a second resin material which forms the fuel tank body, and the fuel pump is inserted into an opening at the center of the insert ring, and a flange portion of the fuel pump is fastened by bolts by inserting the bolts into the boss holes which are formed in the insert molded body and are exposed outside the fuel tank body.

Due to such a construction, the insert molded body is formed by preliminarily performing the insert molding of the insert ring using the first resin material. Thereafter, the insert molded body is inserted into the outer surface of the fuel tank body by insert molding using the second resin material which forms the fuel tank body. Then, the fuel pump is inserted into the fuel tank body, and the flange portion of the fuel pump is fastened to the insert ring by inserting bolts in the boss holes formed in the inert ring thus mounting the fuel pump on the fuel tank body. Accordingly, in inserting the insert ring in the fuel tank body, the second resin material is bonded to the insert molded body which is already formed by insert molding using the first resin material. Thus, compared to the case in which the insert molding is performed by directly inserting the insert ring into the fuel tank body, it is possible to make the resin material easily and sufficiently wrap around the insert ring. Accordingly, it is possible to bond the insert molded body and the second resin material to each other with no gap therebetween without being influenced by the shape of the insert ring. Thus, the insert ring can be surely inserted into an outer surface of the fuel tank body thus easily molding the fuel tank Further, the fuel pump can be mounted by way of the insert ring which is surely inserted into the outer surface of the fuel tank body. Thus, the fuel pump can be surely mounted on the resin-made fuel tank.

According to the fuel tank of an embodiment of the present invention, the insert molded body which is formed by performing insert molding of the fastening member using the first resin material is subject to insert molding using the second resin material thus inserting the fastening member into the fuel tank body. Accordingly, the insert molded body in which the first resin material surely wraps around the fastening member is inserted into the second resin material which constitutes the fuel tank body by insert molding without any gap. Here, the second resin material is bonded to the insert molded body which is already formed by insert molding using the first resin material. Thus, the resin material can easily and sufficiently wrap around the insert molded body. Accordingly, the insert molded body and the second resin material can be bonded with each other with no gap without being influenced by the shape of the fastening member. Thus, the fastening member is surely inserted into the outer surface of the fuel tank body thus easily molding the fuel tank.

Further, in inserting the insert ring into the fuel tank body by insert molding, it is possible to make the resin sufficiently wrap around the insert ring without influencing the positional relationship between the plurality of seat surfaces and the boss holes thus favorably molding the fuel tank Further, due to injection molding, it is possible to easily mold the insert molded body in which the first resin material sufficiently wraps around the respective portions of the fastening member. Further, by performing the insert molding of this insert molded body using the second resin material, the resin sufficiently wraps around the insert molded body thus favorably molding the fuel tank.

Further, with the use of polyethylene having molecular weights which exhibit resin fluidity suitable for molding, the resin can favorably wrap around thus favorably molding the fuel tank.

Further, the groove or the stepped portion for mounting the O-ring can be easily formed by injection molding. Still further, in forming the fuel tank body using the second resin material, it is unnecessary to form such a groove or a stepped portion. Thus, it is possible to surely make the resin wrap around the insert molded body.

Further, a force which the O-ring receives is received by the annular-shaped body of the fastening member. Thus, a strength of the mounting surface of the O-ring can be ensured.

Still further, since the fuel pump can be mounted by way of the insert ring surely inserted into the outer surface of the fuel tank body, the fuel pump can be surely mounted on the resin-made fuel tank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment is explained in conjunction with drawings.

Figure 1:
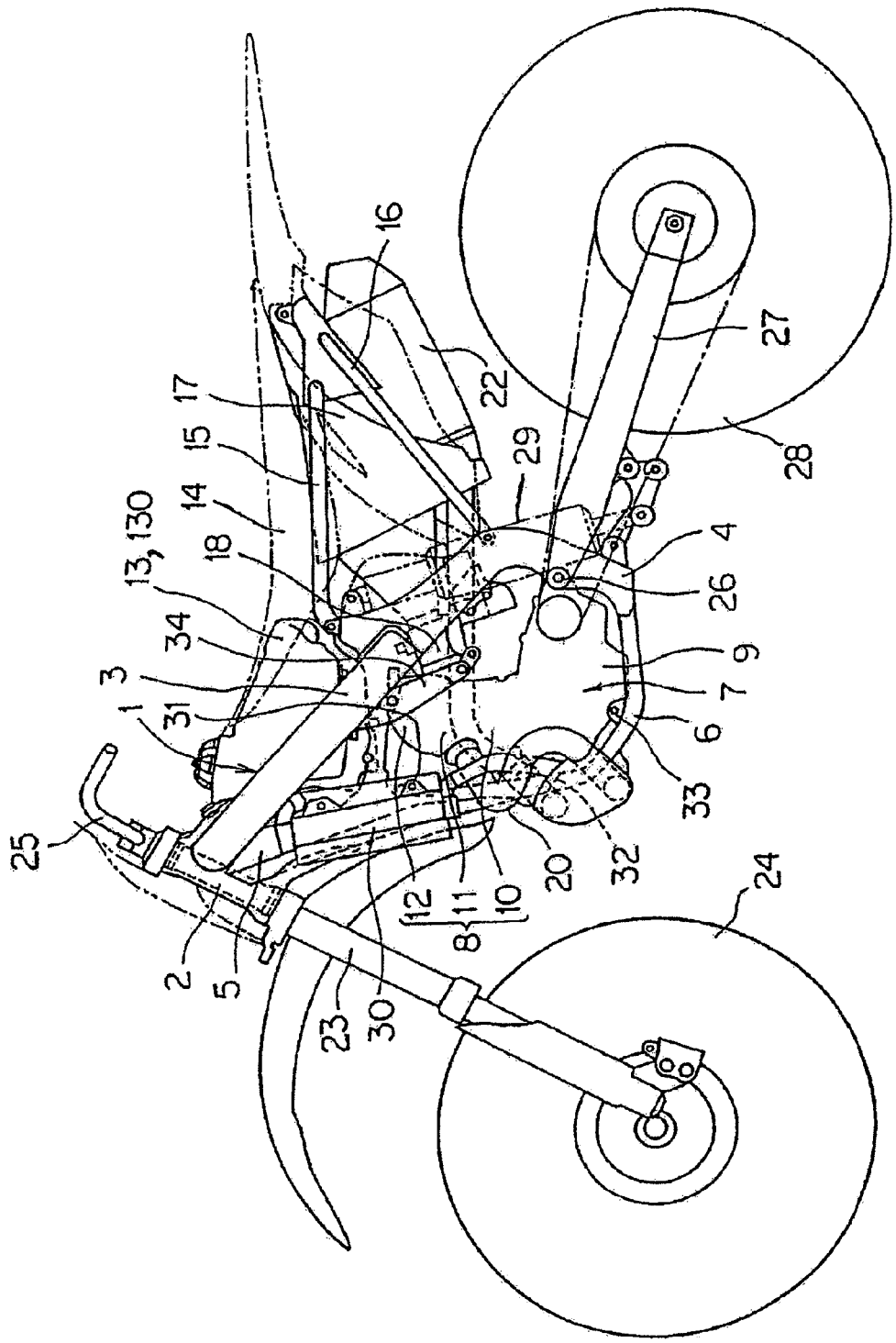
FIG. 1 is a side view of a motorcycle according to an embodiment of the present invention.

FIG. 1 is a side view of an off-road-type motorcycle provided with the fuel pump mounting structure according to an embodiment of the present invention.

A vehicle body frame I of the motorcycle includes a head pipe 2, a main frame 3, a center frame 4, a down frame 5 and a lower frame 6. These members are connected in a loop shape and an engine 7 is supported inside the loop. The engine 7 includes a cylinder 8 and a crankcase 9. The main frames 3, the center frames 4 and the lower frames 6 are respectively provided in right-and-left pairs, while the head pipe 2 and the down frame 5 are provided respectively as single members along the center of a vehicle body.

The main frame 3 extends linearly in the oblique downward and rearward direction above the engine 7, and is connected to upper end portions of the center frames 4 which extend in the vertical direction behind the engine 7. The down frames 5 extend in the oblique downward direction in front of the engine 7, and has a lower end portion thereof connected to front end portions of the lower frames 6. The lower frames 6 are bent to a position below the engine 7 from a front-side lower portion of the engine 7, and extend rearwardly in an approximately linear shape. Rear end portions of the lower frames 6 are connected with lower end portions of the center frames 4.

A fuel tank 13 is arranged above the engine 7 and is supported on the main frame 3. A seat 14 is arranged behind the fuel tank 13, and is supported on a seat rail 15 which extends rearwardly from an upper end of the center frame 4. A reinforcing pipe 16 is arranged below the seat rail 15. An air cleaner 17 is supported on the seat rail 15 and the reinforcing pipe 16, and air is taken into the cylinder head 11 through a throttle body 18 from a rear side of a vehicle body.

An exhaust pipe 20 extends downwardly from a front portion of the cylinder 8 while being bent in an approximately S shape. The exhaust pipe 20 extends rearwardly through a front portion of the crankcase 9, traverses the center frame 4, and has a rear end portion thereof supported on the reinforcing pipe 16 behind the center frame 4. A muffler 22 is connected to a terminal end of the exhaust pipe 20.

A front fork 23 is supported on the head pipe 2, and a front wheel 24 supported on a lower end portion of the front fork 23 is steered by a handle 25. A front end portion of the rear arm 27 is mounted on a pivot shaft 26 of the center frame 4, and is pivotally supported about the pivot shaft 26. A rear wheel 28 is supported on a rear end portion of the rear arm 27, and is driven by the engine 7 by way of a chain. Between the rear arm 27 and a rear end portion of the center frame 4, a shock absorber 29 of a rear suspension is provided.

In FIG. 1, a radiator 30, a rubber mount portion 31, engine mounting portions 32, 33, an engine hanger 34, and an electric component case 35 are provided. The engine 7 is also supported on the center frame 4 by the pivot shaft 26.

Figure 2:
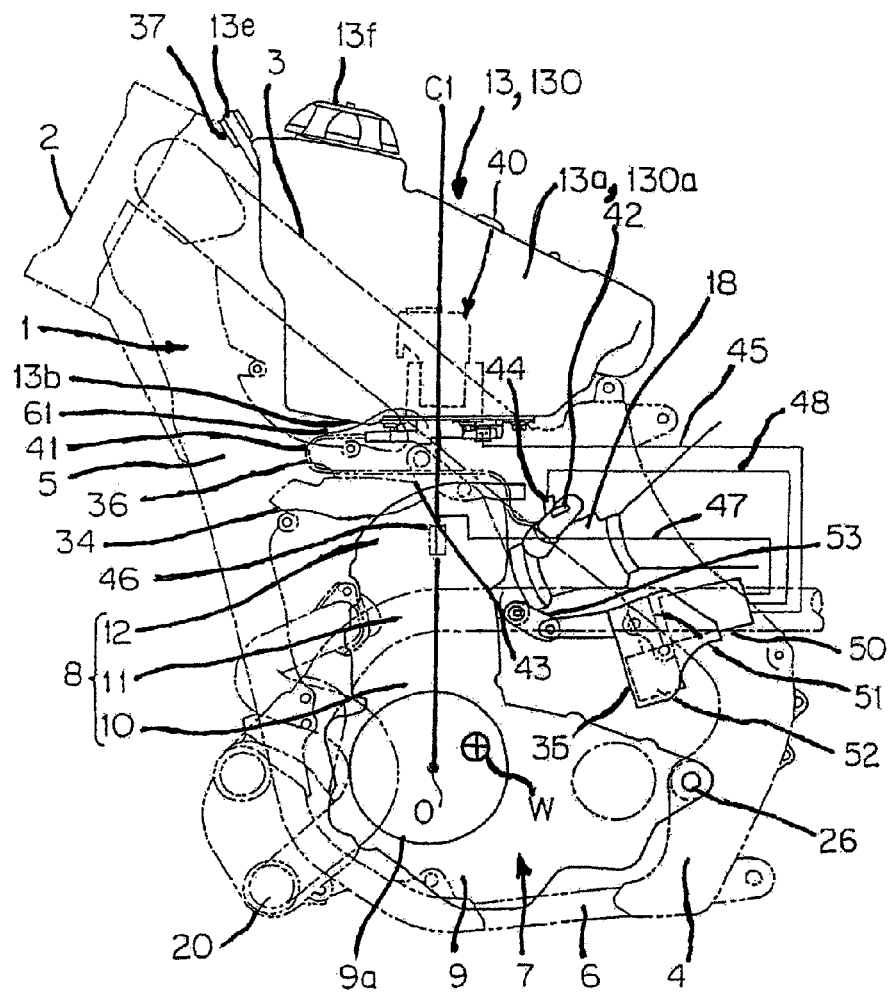
FIG. 2 is an enlarged side view of an engine and a portion of a fuel supply system.

FIG. 2 is an enlarged side view of the engine and a portion of a fuel supply system.

The engine 7 is a water-cooled 4-cycle engine, wherein the cylinder 8 is mounted on a front portion of the crankcase 9 in an upright state where a cylinder axis C1 is arranged substantially vertical, and the cylinder 8 includes a cylinder block 10, a cylinder head 11 and a head cover 12 in order from the bottom to the top. By setting the cylinder 8 upright, the engine 7 can be shortened in the longitudinal direction thus allowing the engine 7 to have the constitution suitable for an offload vehicle.

The fuel tank 13 is arranged directly above the cylinder 8. The fuel tank 13 includes a hollow fuel tank body 13a, and a stiffener portion 36 is arranged between a bottom portion of the fuel tank body 13a and an upper portion of the head cover 12. The stiffener portion 36 is an arm-shaped frame reinforcing member which connects a vertically intermediate portion of the down frame 5 and a rear portion of the main frame 3. A built-in fuel pump 40 is housed in the inside of the fuel tank body 13a.

The fuel pump 40 is also arranged directly above the cylinder 8, and is arranged to overlap with an extension in the axial direction of the cylinder axis C1 which is the center of the cylinder 8 (axis of the piston). The arrangement of the fuel pump 40 may be moved more or less in the longitudinal direction provided that the fuel pump 40 partially overlaps with the cylinder axis C1. Also in this case, the fuel pump 40 is arranged such that the fuel pump 40 falls within a longitudinal width of the cylinder 8 as viewed in a side view, that is, within a distance defined by upwardly extending front and rear profile lines of the cylinder 8. Due to such an arrangement, it is possible to arrange the fuel pump 40 having a large weight in the vicinity of the center of gravity W of the engine 7 in the longitudinal direction of the vehicle body. The center of gravity W of the engine 7 is arranged extremely close to the axis O of the crankshaft 9a in the oblique rearward and upward direction.

The fuel pump 40 is inserted into the inside of the fuel tank body 13a through an opening 13c formed in a bottom portion 13b of the fuel tank body 13a (see FIG. 5), a fuel supply pipe 41 extends toward a front side of the vehicle body from a base portion 61 which constitutes a bottom portion of the fuel pump 40 (the detail of the base portion 61 being explained later, see FIG. 3), is folded back rearwardly and is connected to a fuel injection nozzle 42 of the throttle body 18. The fuel injection nozzle 42 constitutes a known electronic fuel injection device. The fuel supply pipe 41 is a passage for supplying a high pressure fuel to the fuel injection nozzle 42 from the fuel pump 40. The fuel supply pipe 41 is formed with a relatively short pipe which passes between the bottom portion 13b and the head cover 12 in a curved shape and reaches a rear portion of the cylinder head 11. Due to such piping, a pressure loss of the fuel can be reduced and, at the same time, such piping contributes to the reduction of weight of the engine.

The throttle body 18 is connected to an intake passage 43 which is formed in the cylinder head 11 and extends upwardly in the oblique direction. The fuel injection nozzle 42 is obliquely inserted into a socket formed in a side surface of the throttle body 18, and an injection port formed in a distal end of the fuel injection nozzle 42 faces the inside of the intake passage 43 so as to inject fuel to the inside of the intake passage 43. One end of a control-use electric line 48 is connected to the fuel injection nozzle 42 by way of an electric line connector 44.

To an ignition plug 46 mounted on the head cover 12, one end of a high tension cord 47 which constitutes an ignition-use high-voltage electric line is connected so as to enable the application of an ignition-use high voltage. Further, to the fuel pump 40, a drive-use electric line 45 for supplying drive electricity is connected. Respective other ends of these electric lines 45, 47 and 48 are connected to a capacitor 50 mounted in the electric component case 35. In the electric component case 35, as electronic components other than the capacitor 50, a regulator 51 and a fall-over safety switch 52 are housed.

The electric component case 35 has a left side surface thereof supported on the center frame 4 at a position behind the cylinder 8 and above the crankcase 9 as well as at a position close to the cylinder 8. On a right side of the electric component case 35, a stay 53 which extends frontwardly is connected to and supported on the distal end of the engine hanger 34. Further, the exhaust pipe 20 extends rearwardly in an elongated manner along a side of the electric component case 35, and a rear end portion of the muffler 22 opens at a position behind the electric component case 35 (see FIG. 1). Due to such a construction, the electric component case 35 can effectively shield the electric components from heat or exhaust heat from the cylinder 8.

Figure 3:
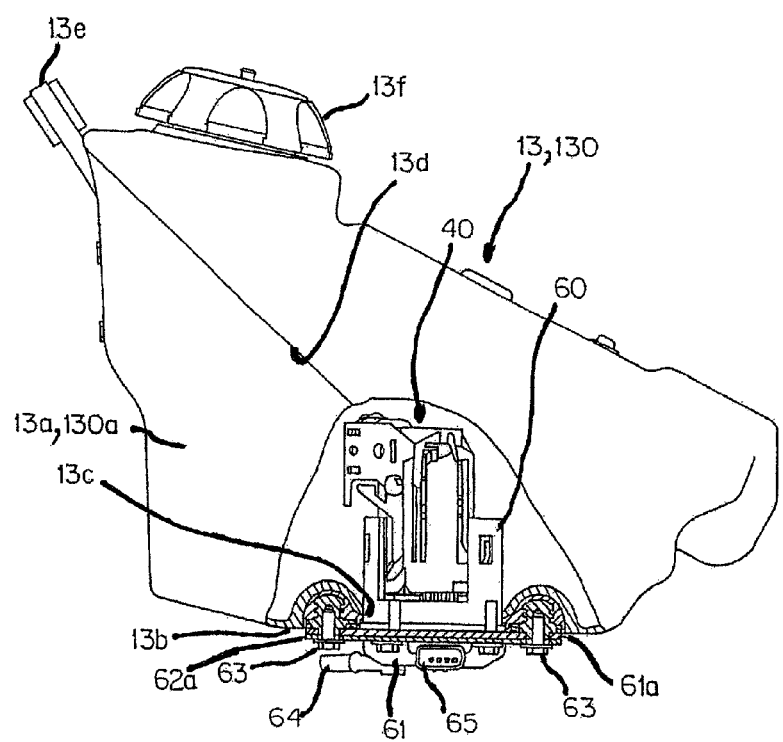
FIG. 3 is a side view showing a fuel tank on which a fuel pump is mounted with a part broken away.
Figure 4:
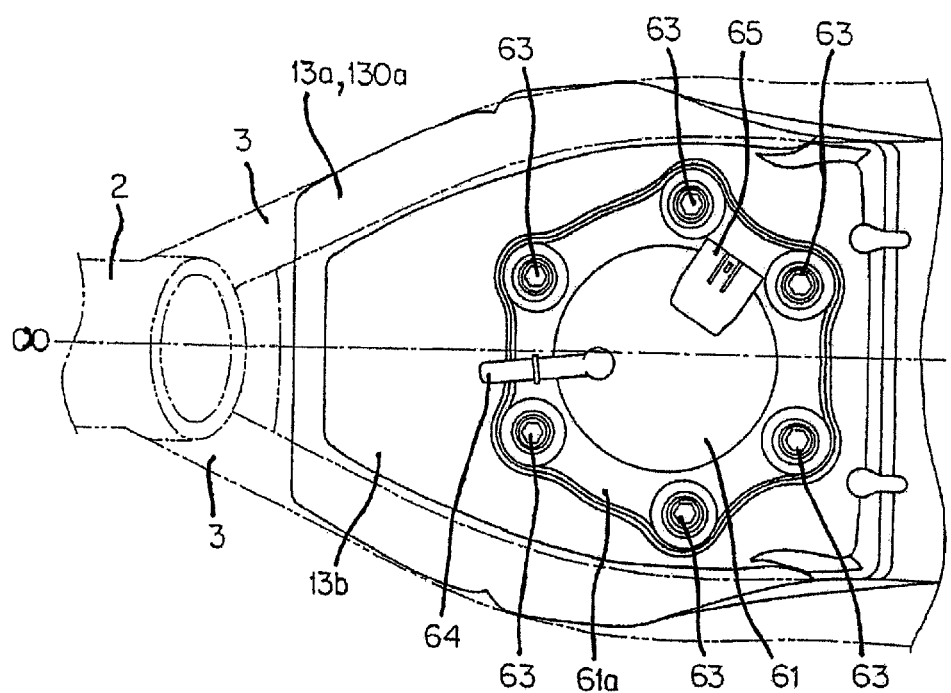
FIG. 4 is a bottom view of the fuel tank on which the fuel pump is mounted.
Figure 5:
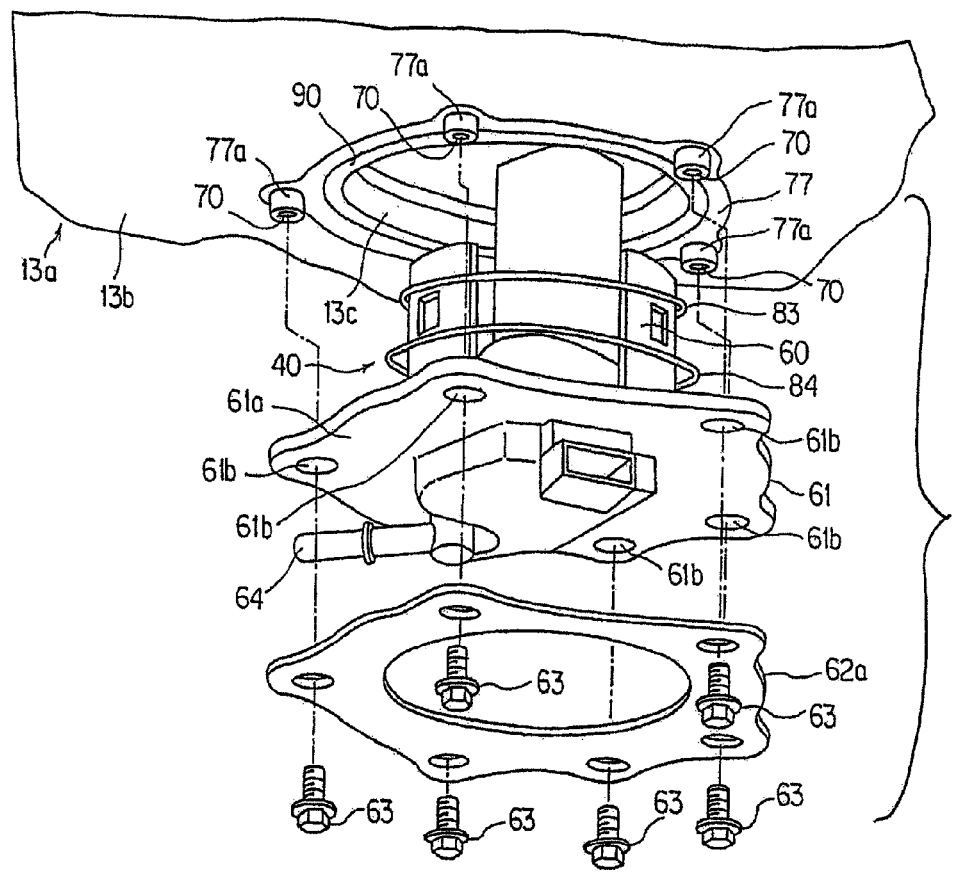
FIG. 5 is an exploded perspective view showing the mounting structure of the fuel pump.

FIG. 3 is a side view showing a side of the fuel tank body 13a with a part cut away, FIG. 4 is a bottom view of the fuel tank body 13a, and FIG. 5 is an exploded perspective view showing the mounting structure of the fuel pump 40.

The fuel tank body 13a, as shown in FIG. 3, is relatively small-sized and has an approximately right-angled triangular shape which has a right-angled portion at a left lower portion thereof as viewed in a side view, wherein an approximately right-angled portion is positioned at a front lower portion of the fuel tank body 13a, and an upper surface of the fuel tank body 13a forms an inclined surface which inclines rearwardly and downwardly. On both side portions of a front portion of the fuel tank body 13a, a stepped portion 13d which is mounted on an upper surface of the main frame 3 is formed. Further, on the front portion of the fuel tank body 13a, a mounting bracket 13e is mounted. This mounting bracket 13e has a lower portion thereof fastened to an upper portion of a front surface of a side wall of the fuel tank body 13a using bolts, and has an upper portion thereof fastened to a gusset 37 (see FIG. 2) which is integrally formed with the head pipe 2 and extends rearwardly using bolts. Further, on an upper portion of the fuel tank body 13a, a tank cap 13f which closes a fuel supply port in an open-and-close manner is mounted.

The fuel pump 40, as shown in FIG. 3, includes a fuel pump body portion 60 which constitutes an upper portion of the fuel pump 40 and a base portion 61 which constitutes a lower portion of the fuel pump 40.

The fuel pump body portion 60 is inserted into the inside of the fuel tank body 13a, and feeds fuel in the tank toward the above-mentioned fuel injection nozzle 42. Further, the base portion 61, in a state that the fuel pump 40 is mounted on the fuel tank body 13a, is configured to be exposed downwardly from the bottom portion 13b of the fuel tank body 13a. The base portion 61 has a flange portion 61a which extends sideward from the fuel pump 40 and parallel to the bottom portion 13b. The flange portion 61a, as shown in FIG. 4, has an approximately hexagonal shape as viewed from below, and mounting holes 61b are respectively formed in six vertex portions of the hexagonal shape. The fuel pump 40 is fastened to the bottom portion 13b of the fuel tank body 13a from below by way of a ring-shaped plate 62a using six bolts 63 in a state that the flange portion 61a is brought into contact with the bottom portion 13b from below (see FIG. 4 and FIG. 5). Further, between the fuel pump 40 and the fuel tank body 13a, an inner-diameter O-ring 83 and a seat surface O-ring 84 described later are interposed.

Further, as shown in FIG. 3, a joint pipe 64 of the base portion 61 which is connected to a discharge port (not shown in the drawing) of the fuel pump body portion 60 extends frontwardly, and one end of the fuel supply pipe 41 (see FIG. 2) is connected to the joint pipe 64. Further, the base portion 61 also includes a connector 65 and an electric line 45 which supplies a drive power source to the fuel pump 40 that is connected to the connector 65. The joint pipe 64 extends obliquely and frontwardly in the vicinity of the center C0 of the vehicle body, and the connector 65 projects sideward in the slightly rearward direction.

As shown in FIG. 4, the main frames 3 extend rearwardly in a laterally split and extending manner from the head pipe 2. Accordingly, a space surrounded by the head pipe 2 and front portions of the left and right main frames 3 defines an approximately acute triangular shape, and a shape of the bottom portion 13b of the fuel tank body 13a housed in the space also narrows a width thereof toward the front head pipe 2. A position where the base portion 61 of the fuel pump 40 is mounted is a position arranged by making use of a maximum-width portion of the bottom portion 13b.

Figure 6:
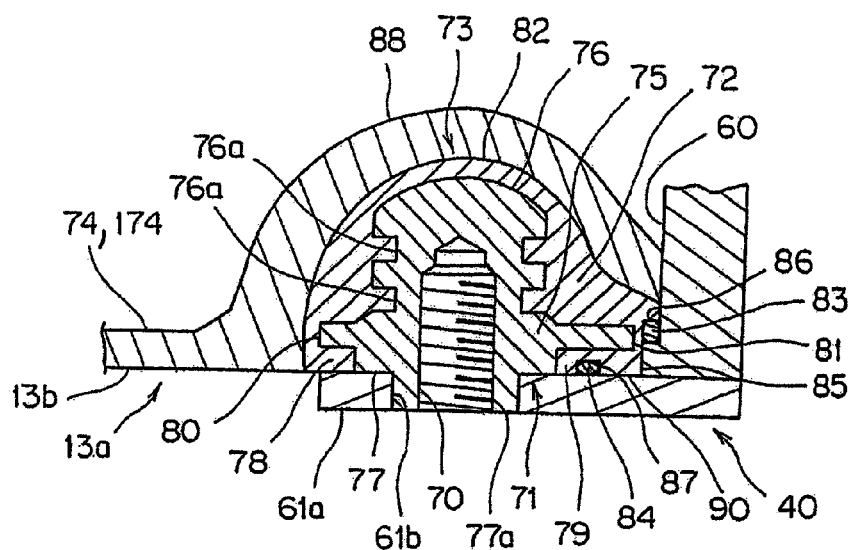
FIG. 6 is an enlarged cross-sectional view showing a mounting portion of the fuel tank and the fuel pump.

FIG. 6 is an enlarged cross-sectional view of the mounting portion where the fuel tank body 13a and the fuel pump 40 are fixed to each other using bolts 63 (FIG. 3).

Boss holes 70 through which the bolts 63 for fixing the fuel pump 40 to the bottom portion 13b penetrate are formed in the bottom portion 13b of the fuel tank body 13a. The mounting portion where the fuel pump 40 is fixed to the fuel tank body 13a is constituted of an insert ring 71 (fastening member) in which the boss hole 70 is formed, a first resin material 72 which covers the insert ring 71 in a wrapping manner by insert molding, and a second resin material 74 which constitutes the fuel tank body 13a.

As shown in FIG. 6 which is a cross-sectional view, the mounting portion is constituted of three different members. To be more specific, the mounting portion is configured such that an insert molded body 73 is formed by performing the insert molding of the insert ring 71 which includes the boss hole 70 using the first resin material 72 and, thereafter, by performing the insert molding of the insert molded body 73 using the second resin material 74 at the time of molding the fuel tank body 13a. Here, the insert ring 71 is made of a metal material, the first resin material 72 and the second resin material 74 are polyethylenes which differ in molecular weight, wherein polyethylene which constitutes the second resin material 74 is used for forming the fuel tank body 13a.

Figure 7:
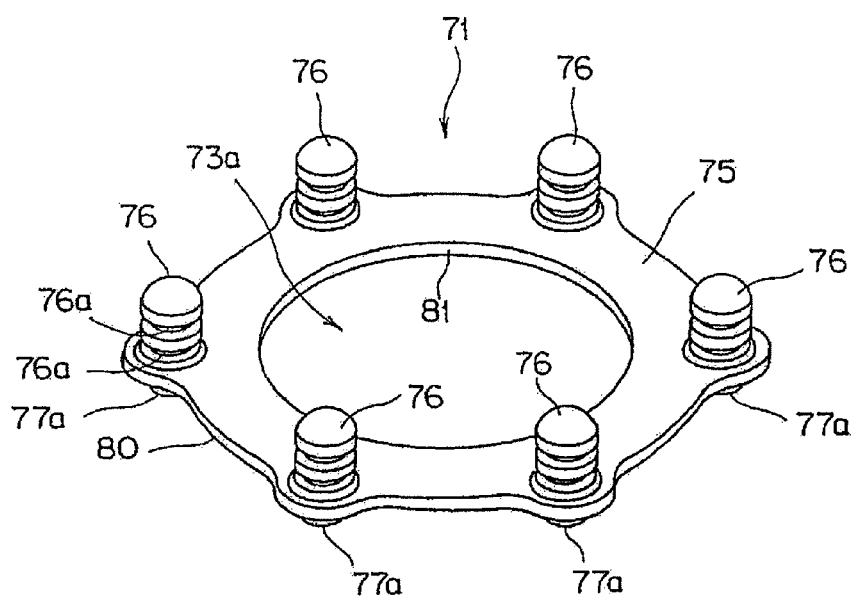
FIG. 7 is a perspective view of an insert ring.

FIG. 7 is a perspective view of the insert ring 71.

The insert ring 71 is configured such that the boss holes 70 are respectively formed in an annular body ring 75 at positions where the circumference of the annular body ring 75 is substantially equally divided in six. The boss hole 70 is a tapped hole having a bottom which is arranged at a position corresponding to a mounting hole 61b formed in the fuel pump 40. The boss holes 70 are formed in a seat surface 77 which is a contact surface with the body ring 75 and a flange portion 61a of the fuel pump 40, wherein the seat surface 77 forms a continuous annular planar surface on one surface of the body ring 75. The seat surface 77 around the boss holes 70 projects in an approximately semi-circular shape in the direction toward an outer periphery of the body ring 75. Further, around the boss hole 70, a collar portion 77a which is fitted into the mounting hole 61b of the fuel pump 40 is formed.

On the other surface of the body ring 75 where the boss hole 70 is arranged, an approximately columnar boss portion 76 which is formed upright in the plate thickness direction is formed, wherein a depth of the boss hole 70 exceeds a thickness of the body ring 75 and reaches the inside of the boss portion 76. Further, in the boss portion 76, groove portions 76a having an outer diameter smaller than an outer diameter of the approximately columnar shape are formed at two positions in the axial direction of the column. Further, an upper portion of the boss portion 76 is formed in a round shape.

Since the first resin material 72 flows along this round-shaped portion, the first resin material 72 easily wraps around the insert ring 71.

The insert ring 71 is formed by integral molding such that an insert which is constituted of an iron-made nut having the boss hole 70 is integrally formed with the main-body ring 75 made of aluminum by die casting. Further, the insert ring 71 may be formed by integrally forming the body ring 75 and the boss portion 76 by forging the aluminum material, and the boss hole 70 is formed by tapping.

As shown in FIG. 6, on an outer peripheral side surface of the body ring 75, an outer peripheral flange 80 which extends toward an outer peripheral side of the body ring 75 at a position one stage higher than the seat surface 77 is formed. Further, on an inner peripheral side surface of the body ring 75, an inner peripheral flange 81 which extends toward an inner peripheral side of the body ring 75 at a position one stage higher than the seat surface 77 is formed. The outer peripheral flange 80 and the inner peripheral flange 81 are formed annually over the whole circumference of the body ring 75.

Below the outer peripheral flange 80, an outer peripheral stepped portion 78 which is recessed one stage higher than the seat surface 77 is formed. Further, below the inner peripheral flange 81, an inner peripheral stepped portion 79 which is recessed one stage higher than the seat surface 77 is formed. The outer peripheral stepped portion 78 and the inner peripheral stepped portion 79 are formed annularly over the whole circumference of the body ring 75.

Figure 8:
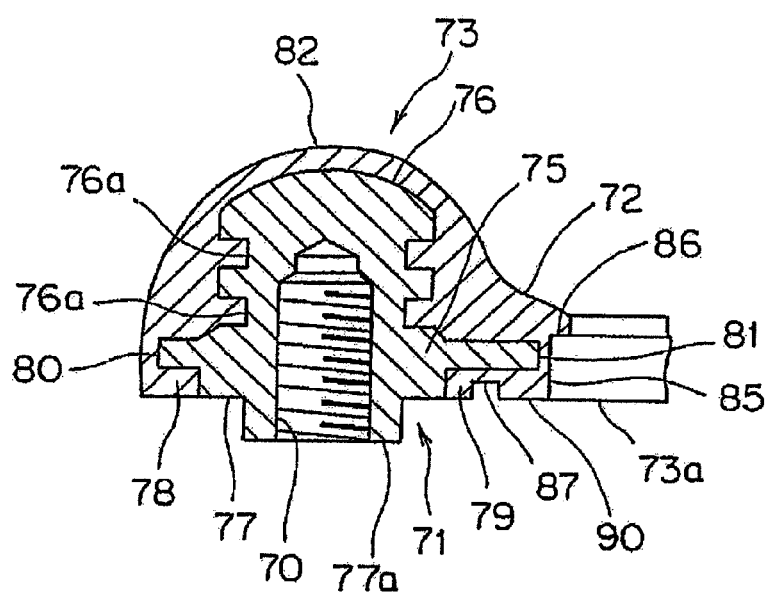
FIG. 8 is an enlarged cross-sectional view of the vicinity of a boss hole formed in an insert molded body.

FIG. 8 is an enlarged cross-sectional view of the vicinity of the insert molded body 73 including the boss hole 70.

The insert molded body 73 is formed by performing insert molding of the insert ring 71 using the first resin material 72 by injection molding. Here, insert molding is a technique in which a part or the like to be inserted is preliminarily mounted in the inside of a mold, and molten resin, resin powder or the like is filled in the mold, and the part or the like and the resin are integrally molded. To be more specific, the insert molded body 73 is formed such that the above-mentioned insert ring 71 is preliminarily mounted in the inside of a mold for injection molding, the molten first resin material 72 is injected into the mold, and the insert ring 71 and the first resin material 72 are cooled so as to form the insert ring 71 and the first resin material 72 integrally.

As shown in FIG. 8, after injection molding, the first resin material 72 is adhered to a surface of the insert ring 71 such that the boss holes 70, the seat surface 77 and the collar portions 77a are exposed. Thus, the insert ring 71 and the first resin material 72 are integrally formed thus constituting the insert molded body 73. The insert molded body 73 keeps a basic shape of the insert ring 71, convex portions 82 are formed at six portions corresponding to the boss portions 76 of the insert ring 71, and an upper portion of the convex portion 82 is formed in an approximately R shape. Further, in FIG. 8 which shows a cross section in the vicinity of boss hole 70, the insert molded body 73 is formed such that the seat surface 77 is exposed on the body ring 75 on which the boss portion 76 is not formed. Further, the insert molded body 73 has an opening 73a in which the fuel pump 40 is inserted at the center thereof.

Further, due to injecting molding, the first resin material 72 wraps around the outer peripheral stepped portion 78 and the inner peripheral stepped portion 79 thus forming a seat surface 90 which receives the flange portion 61a. The seat surface 90 is formed coplanar with the seat surface 77 of the insert ring 71. Further, the first resin material 72 also wraps around small complicated-shaped portions such as groove portions 76a of the boss portions 76, the outer peripheral stepped portion 78, the inner peripheral flange 81, the outer peripheral flange 80 and the inner stepped portion 79. Thus, a contact area of the first resin material 72 with the insert ring 71 is large whereby a large adhesion strength can be acquired between the insert ring 71 and the first resin material 72.

As shown in FIG. 6, between the fuel pump 40 and the fuel tank body 13a, an inner-diameter O-ring 83 and a seat surface O-ring 84 are arranged for hermetic seating.

The inner-diameter O-ring 83 is an O-ring which is provided between the fuel pump body portion 60 and an inner-diameter portion 85 of the insert molded body 73 approximately concentrically with the body ring 75. Further, on the inner-diameter portion 85 which is constituted of the first resin material 72, a stepped portion 86 for fixing the inner-diameter O-ring 83 is formed. The stepped portion 86 is an annular stepped portion which projects in the radial inward direction of the insert molded body 73 and is provided approximately concentrically with the body ring 75 in the inner-diameter portion 85. The stepped portion 86 defines, in a state that the fuel pump 40 is mounted on the fuel tank body 13a, a closed space between the stepped portion 86 and the fuel pump body portion 60, and the inner-diameter O-ring 83 is fixed in this closed space.

Further, the stepped portion 86 is formed such that the inner-diameter portion 85 is recessed toward the body ring 75 in the inside of the insert molded body 73, and in the vicinity of the stepped portion 86 inside the insert molded body 73, the inner peripheral flange 81 of the body ring 75 is positioned. Due to such a construction, a force generated by mounting the inner-diameter O-ring 83 in a deflected manner is received by the inner peripheral flange 81 made of the metal material. Accordingly, the inner-diameter O-ring 83 is surely received by the inner peripheral flange 81. Further, the stepped portion 86 is formed to overlap the inner peripheral flange 81 as viewed from the surface of the fuel pump body portion 60.

On the other hand, a seat surface O-ring 84 is an O-ring which is arranged on a contact surface between the flange portion 61a of the fuel pump 40 and the insert molded body 73 approximately concentrically with the body ring 75. In the seat surface 90 which is a surface of a portion of the inner peripheral stepped portion 79 embedded with the first resin material 72, a groove 87 which houses the seat surface O-ring 84 is formed. The groove 87 is an annular groove formed approximately concentrically with the body ring 75.

Further, the groove 87 is a groove which is recessed toward the inner peripheral flange 81 inside the insert molded body 73 from the seat surface 90. More specifically, as viewed from a side of the seat surface 77 and the seat surface 90, the groove 87 is formed so as to overlap the inner peripheral flange 81. Accordingly, in the vicinity of the groove 87 inside the insert molded body 73, the inner peripheral flange 81 of the body ring 75 is positioned. Thus, a force generated by mounting the seat surface O-ring 84 in a deflected manner is received by the inner peripheral flange 81 made of the metal material. Accordingly, the seat surface O-ring 84 can be surely received by the inner peripheral flange 81.

Further, the stepped portion 86 and the groove 87 are formed to be recessed toward the inside of the insert molded body 73 from the surface of the first resin material 72, and the stepped portion 86 and the groove 87 are formed at the time of performing insert molding by injection molding and hence, the stepped portion 86 and the groove 87 can be formed easily.

The insert molded body 73 is inserted into the fuel tank body 13a by insert molding. To be more specific, the insert molded body 73 is preliminarily mounted in a mold and, thereafter, the second resin material 74 supplied in a powder form is filled in the mold and rotary molding is performed. Thus, simultaneous with the molding of the fuel tank body 13a, the insert molding of the insert molded body 73 on the fuel tank body 13a is performed. Here, the rotary molding is molding in which a thermoplastic power resin is filled in the mold, the mold is heated to a temperature of 360° C., for example, inside a heating furnace, the resin is melted while being rotated with respect to two axial directions and, thereafter, the inside of the mold is cooled and solidified to form a molded product.

Due to such rotary molding, the insert molded body 73 is inserted into the bottom portion 13b of the fuel tank body 13a made of the second resin material 74 by insert molding. As shown in FIG. 6, the insert molded body 73 and the second resin material 74 are bonded to each other in a state wherein the second resin material 74 is brought into contact with the upper surface and the outer peripheral side surface of the insert molded body 73. On a boundary of bonding between the insert molded body 73 and the second resin material 74, the first resin material 72 which is used for forming the insert molded body 73 and the second resin material 74 are melted to be bonded to each other. Thus, a high bonding strength can be acquired. Further, the insert molded body 73 is mounted in the mold body for rotary molding such that the second resin material 74 is not adhered to the bottom surface and the inner diameter portion 85 of the insert molded body 73 at the time of performing the rotary molding. Thus, there is no possibility that the second resin material 74 is adhered to the boss hole 70, the seat surface 77, the collar portion 77a, the stepped portion 86 and the groove 87. Further, the seat surface 77 and the seat surface 90 are arranged substantially coplanar with the bottom portion 13b of the fuel tank body 13a. Thus, the boss hole 70 is exposed on the surface of the bottom portion 13b.

Further, in the first embodiment, at the time of forming the insert molded body 73, the first resin material 72 wraps around the outer peripheral stepped portion 78 and the inner peripheral stepped portion 79. Thus, the outer peripheral stepped portion 78 and the inner peripheral stepped portion 79 are embedded with the first resin material 72. Thereafter, the insert molded body 73 is inserted into the fuel tank body 13a by insert molding due to such rotary molding wherein the insert ring 71 having the outer peripheral stepped portion 78, the inner peripheral stepped portion 79 or the like where it is difficult for a resin to wrap around can be surely inserted into the fuel tank body 13a thus favorably molding the fuel tank body 13a.

Further, the insert molded body 73 is formed such that the convex portions 82 which are directed toward the inside of the fuel tank body 13a are provided at six places, and the convex portions 82 are inserted into the fuel tank body 13a when the insert molding of the insert molded body 73 into the second resin material 74 is performed. Accordingly, the second resin material 74 which is bonded to the convex portion 82 forms the projecting portion 88 having an approximately R shape. Accordingly, when a force in the rotary direction or the lateral direction is applied to the insert molded body 73 particularly, the projecting portion 88 can receive a greater force. Thus, it is possible to strongly insert the insert molded body 73. Further, in FIG. 6 which shows the cross section of the vicinity of the convex portion 82, the second resin material 74 is also brought into contact with and is bonded to the upper surface and the outer peripheral side surface of the insert molded body 73 on which the convex portion 82 is not formed.

High-density polyethylene is used for forming both of the first resin material 72 and the second resin material 74. However, the resin does not exhibit large fluidity in rotary molding. Thus, a high-density polyethylene having a molecular weight smaller than a molecular weight of the high-density polyethylene which forms the first resin material 72 is used for the second resin material 74. Accordingly, this embodiment can acquire the favorable flow of resin at the time of performing the rotary molding. Thus, the insert molded body 73 can be surely inserted into the fuel tank body 13a by insert molding. Further, the second resin material 74 may be used in a form that middle-density polyethylene is mixed into high-density polyethylene.

Although the first resin material 72 and the second resin material 74 are formed using polyethylene, nylon, polybutylene terephthalate, polycarbonate, polyphenylene sulfate or the like can be used.

As has been explained heretofore, according to the first embodiment of the present invention, the insert molded body 73 is formed by preliminarily performing the insert molding of the insert ring 71 using the first resin material 72 and, thereafter, the insert molding of the insert molded body 73 is performed using the second resin material 74 which forms the fuel tank body 13a thus inserting the insert ring 71 into the fuel tank body 13a. Accordingly, in inserting the insert ring 71 into the fuel tank body 13a, the second resin material 74 is bonded to the insert molded body 73 which is already formed by performing the insert molding of the insert ring 71 using the first resin material 72. Accordingly, compared to the situation wherein the insert molding is performed by directly inserting the insert ring 71 into the fuel tank body 13a, it is possible to make the resin material sufficiently wrap around the insert ring 71. Accordingly, it is possible to bond the insert molded body 73 and the second resin material 74 to each other with no gap therebetween without being influenced by the shape of the insert ring 71. Thus, the insert ring 71 can be surely inserted into an outer surface of the fuel tank body 13a thus easily molding the fuel tank body 13a.

Further, in inserting the annular insert ring 71 into the fuel tank body 13a, it is possible to make the resin sufficiently wrap around the insert ring 71 without influencing the positional relationship between the plurality of seat surfaces 77 and the boss holes 70 thus favorably forming the fuel tank body 13a.

Further, due to injection molding, the first resin material 72 adheres to the surface of the insert ring 71 and sufficiently wraps around the respective portions of the insert ring 71. Accordingly, it is possible to easily mold the insert molded body 73 in which the first resin material 72 sufficiently wraps around the insert ring 71. Further, by performing the insert molding of this insert molded body 73 using the second resin material 74, the fuel tank body 13a can be favorably molded.

Further, the second resin material 74 used in the rotary molding is polyethylene which has smaller molecular weight than the first resin material 72 which is used for the injection molding and exhibits high resin fluidity. Thus, the second resin material 74 is suitable for rotary molding. Accordingly, wrapping around of the second resin material 74 is enhanced thus enabling the favorable molding of the fuel tank body 13a.

Further, the groove 87 in which the seat surface O-ring 84 is arranged and the stepped portion 86 in which the inner-diameter O-ring 83 is arranged can be easily formed by injection molding. Still further, the groove 87 and the stepped portion 86 are preliminarily formed in the insert molded body 73. Thus, in molding the fuel tank body 13a using the second resin material 74, it is unnecessary to form the groove 87 and the stepped portion 86. Thus, it is possible to surely make the second resin material 74 wrap around the insert molded body 73 thus favorably molding the fuel tank body 13a.

Further, in the direction of a force which the seat surface O-ring 84 arranged in the groove 87 and the inner-diameter O-ring 83 arranged in the stepped portion 86 receive, the body ring 75 of the insert ring 71 is positioned. Thus, the forces which the seat surface O-ring 84 and the inner-diameter O-ring 83 receive can be received by the body ring 75 whereby a strength of the mounting surface of the seat surface O-ring 84 and the inner-diameter O-ring 83 can be ensured. Accordingly, the fuel pump 40 and the mounting portion of the fuel tank body 13a can be surely sealed hermetically.

Further, since the fuel pump 40 can be mounted by way of the insert ring 71 surely inserted into the outer surface of the fuel tank body 13a, the fuel pump 40 can be surely mounted on the resin-made fuel tank body 13a.

The first embodiment describes one mode to which the present invention is applied, and the present invention is not limited to the first embodiment.

For example, in the first embodiment, the explanation has been made with respect to the case in which the fuel pump 40 is mounted on the fuel tank body 13a by way of the insert ring 71. However, the present invention is not limited to such a case. For example, an open/close lid or a fuel cock of the fuel tank body 13a may be mounted by way of the insert ring 71. Further, in the first embodiment, the explanation has been made with respect to the case in which the fuel pump 40 is mounted such that the fuel pump 40 extends into the inside of the fuel tank body 13a after passing through the opening 73a formed in the annular insert molded body 73. However, the present invention is not limited to such a case. For example, a plate-shaped insert molded body may be formed by performing insert molding of a plate-shaped fastening member using the first resin material 72, and the insert molded body is inserted into the fuel tank body 13a by insert molding thus mounting a part on an outer side of the fuel tank body 13a. Further, a place where a part is mounted is not limited to the fuel tank body 13a. For example, a part such as a grab rail may be mounted on a motorcycle by embedding a plate-shaped insert molded body into an exterior of the motorcycle. Further, the explanation has been made with respect to a case in which a depth of the boss hole 70 reaches the inside of the boss portion 76 exceeding a thickness of the body ring 75 in the first embodiment. However, the present invention is not limited to such a case. For example, a boss hole 70 having a depth smaller than the thickness of the body ring 75 may be formed in the body ring 75 on which the boss portion 76 is not formed. Further, in the first embodiment, the explanation has been made with respect to the case in which the inner-diameter portion 85 and the stepped portion 86 are formed using the first resin material 72. However, to enhance an adhesive strength between the first resin material 72 and the second resin material 74, insert molding may be performed using the second resin material 74 which also includes the inner-diameter portion 85 and the stepped portion 86 of the first resin material 72 thus forming the inner diameter portion 85 and the stepped portion 86 using the second resin material 74. It is needless to say that other detailed constructions can be arbitrarily modified.

In the second embodiment, with respect to parts having the same constitution as the corresponding parts of the above-mentioned first embodiment, their explanation is omitted while adding the same symbols.

A fuel tank 130 of the second embodiment differs from the fuel tank of the first embodiment with respect to a point that a fuel tank body 130a is molded by blow molding.

The blow molding is a molding method in which a heated resin pipe is sandwiched by molds, air is injected into the pipe to inflate the pipe so as to make the pipe adhered to an inner surface of the molds and, thereafter, the pipe is cooled and solidified. This blow molding is applicable to a resin having a larger molecular weight than a molecular weight of a resin which can be used by rotary molding. Accordingly, as a second resin material 174, high-density polyethylene having a molecular weight larger than a molecular weight of a first resin material 72 is used. Due to such blow molding, it is possible to surely insert the insert molded body 73 into the fuel tank body 130a having a higher strength by insert molding.

According to the second embodiment, the second resin material 174 used in blow molding is polyethylene having the larger molecular weight and higher strength than the first resin material 72 used in inject molding. Thus, it is possible to surely insert the insert molded body 73 into the fuel tank body 130a having the high strength by insert molding.

Further, in the second embodiment, the explanation has been made with respect to the case in which the inner-diameter portion 85 and the stepped portion 86 are formed using the first resin material 72. However, to enhance an adhesive strength between the first resin material 72 and the second resin material 174, insert molding may be performed using the second resin material 174 which also includes the inner-diameter portion 85 and the stepped portion 86 of the first resin material 72 thus forming the inner diameter portion 85 and the stepped portion 86 using the second resin material 174. It is needless to say that other detailed constitutions can be arbitrarily modified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel tank comprising:
    an insert ring mounted on a resin-made fuel tank body, the insert ring comprising an annular body having a first seat surface with boss holes for mounting a fuel pump, the boss holes being arranged closer to an outer periphery of the annular body than to an inner periphery of the annular body;
    a first resin material adhered around the insert ring above the first seat surface by injection molding to form an insert molded body, the boss holes and the first seat surface of the insert ring remaining exposed,
    wherein the first resin material of the insert molded body includes an inner peripheral stepped portion disposed under an inner peripheral flange of the insert ring, and an outer peripheral stepped portion disposed under an outer peripheral flange of the insert ring,
    the inner and outer peripheral stepped portions forming a second seat surface which rests on an upper surface of a flange portion of the fuel pump,
    wherein the insert molded body is inserted into an outer surface of the fuel tank body by insert molding using a second resin material which forms the fuel tank body, and
    wherein the first and second seat surfaces are substantially coplanar with a bottom portion of the fuel tank body.

2. The fuel tank according to claim 1, wherein the first resin material and the second resin material are polyethylene resins, and a molecular weight of the first resin material differs from a molecular weight of the second resin material.

3. The fuel tank according to claim 1, wherein an annular groove for fitting of an O-ring is formed in the first resin material of the insert molded body, and the annular groove is approximately concentric with the annular body.

4. The fuel tank according to claim 3, wherein the annular groove formed in the insert molded body is formed to overlap with the insert ring.

5. A fuel tank comprising:

a resin-made fuel tank body;

a fastening member comprising an annular-shaped body mounted on a bottom of the resin-made fuel tank body, and a first seat surface having peripheral boss holes for mounting a fuel pump; and a first resin material adhered around the fastening member above the first seat surface by injection molding to form an insert molded body, the peripheral boss holes and the first seat surface of the fastening member remaining exposed, wherein the first resin material of the insert molded body includes a second seat surface for seating a flange of the fuel pump, the second seat surface comprising an inner peripheral stepped portion disposed under an inner peripheral flange of the fastening member and an outer peripheral stepped portion disposed under an outer peripheral flange of the fastening member, wherein the insert molded body is inserted into an outer surface of the fuel tank body by insert molding using a second resin material which forms the fuel tank body, and wherein the first seat surface and the second seat surface are substantially coplanar with the bottom of the fuel tank body.

6. The fuel tank according to claim 5, wherein the first resin material and the second resin material are formed from a polyethylene resin, and a molecular weight of the first resin material differs from a molecular weight of the second resin material.

7. The fuel tank according to claim 5, wherein the fuel pump is inserted into an opening at a center of the fastening member, and the flange of the fuel pump is provided for fastening the fuel pump using bolts inserted into the peripheral boss holes of the fastening member and the flange is exposed outside the fuel tank body.

8. The fuel tank according to claim 5, wherein the first resin material comprises an exterior annular groove for retaining an O-ring in an approximately concentric manner with the annular-shaped body.

9. The fuel tank according to claim 8, wherein the exterior annular groove is formed to overlap with the insert ring.

* * * * *